United States Patent
Neate et al.

(10) Patent No.: US 12,366,154 B2
(45) Date of Patent: Jul. 22, 2025

(54) HIGH FREQUENCY TORSIONAL OSCILLATION DETECTION BY AN ELECTRICAL MACHINE

(71) Applicant: Baker Hughes Oilfield Operations LLC, Houston, TX (US)

(72) Inventors: Richard Neate, Malaga Andalusia (ES); Bastian Sauthoff, Lower Saxony (DE); Volker Peters, Celle (DE)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 18/627,115

(22) Filed: Apr. 4, 2024

(65) Prior Publication Data

US 2024/0337180 A1    Oct. 10, 2024

Related U.S. Application Data

(60) Provisional application No. 63/494,333, filed on Apr. 5, 2023.

(51) Int. Cl.
*E21B 44/00* (2006.01)
*G01H 1/00* (2006.01)

(52) U.S. Cl.
CPC ............. *E21B 44/00* (2013.01); *G01H 1/003* (2013.01); *E21B 2200/20* (2020.05)

(58) Field of Classification Search
CPC ...... E21B 44/00; E21B 2200/20; G01H 1/003
See application file for complete search history.

(56) References Cited

U.S. PATENT DOCUMENTS

| | | | |
|---|---|---|---|
| 4,150,568 A * | 4/1979 | Berger | E21B 44/00 73/152.58 |
| 4,345,454 A | 8/1982 | Brown | |
| 4,903,245 A * | 2/1990 | Close | E21B 12/02 702/9 |
| 5,151,882 A * | 9/1992 | Kingman | E21B 47/00 702/9 |
| 5,823,261 A | 10/1998 | Drumheller | |
| 2010/0108384 A1 | 5/2010 | Byreddy et al. | |
| 2019/0277091 A1 | 9/2019 | Jones et al. | |

(Continued)

FOREIGN PATENT DOCUMENTS

GB        2343512 A  *  5/2000  ............. E21B 44/00

OTHER PUBLICATIONS

International Search Report & Written Opinion in International Application No. PCT/2024/023207, mailed Jul. 26, 2024; 5 pages.

*Primary Examiner* — James G Sayre
(74) *Attorney, Agent, or Firm* — CANTOR COLBURN LLP

(57) ABSTRACT

A system and method of detecting a vibration of a drill string in a borehole. The drill string is conveyed into the borehole, the drill string including an electrical machine, the electrical machine including a stator and a movable element, the movable element movable relative to the stator, the drill string is rotated in the borehole. A control circuit determines first amplitude of the vibration of the drill string by measuring a signal indicative of a movement of the movable element in the electrical machine due to rotation of the drill string and controls a downhole operation of the drill string based on the detected first amplitude of the vibration.

20 Claims, 5 Drawing Sheets

(56) References Cited

U.S. PATENT DOCUMENTS

2020/0173270 A1  6/2020 Zhan
2022/0372862 A1* 11/2022 Boone .................... E21B 44/02
2024/0052740 A1*  2/2024 Johnson ............... E21B 47/085

* cited by examiner

HIGH FREQUENCY TORSIONAL OSCILLATION DETECTION BY AN ELECTRICAL MACHINE

CROSS REFERENCE TO RELATED APPLICATIONS

This application claims the benefit of an earlier filing date from U.S. Provisional Application Ser. No. 63/494,333 filed Apr. 5, 2023, the entire disclosure of which is incorporated herein by reference.

BACKGROUND

In the resource recovery industry, a drill string is conveyed downhole to drill a borehole. For the purposes of drilling, the drill string includes a drill bit attached to a Bottom Hole Assembly (BHA), connected to a drill pipe that extends to a surface location. During downhole operations, High Frequency Torsional Oscillations (HFTO) of the drill string can occur. The shape, frequency and amplitude of the HFTOs (mode shape) depend primarily on the bit design type, the hardness of the rock formation and the drilling parameters applied during the drilling operation. Also relevant are a rotational frequency of the drill string, a distribution of mass within the drill string and torsional stiffness of the drill string. An optional conventional vibration sensor (including magnetometers and accelerometers) is often disposed close to the drill bit to detect HFTOs. If the conventional vibration sensor happens to be located in a node of the torsional vibration mode, the sensor outputs only a small signal or no signal. However, HFTOs can still propagate upwards from the bit through the BHA, causing significant HFTO presence at other points along the BHA. Accordingly, there is a desire for a reliable system and method for detecting HFTOs in the BHA during a drilling operation using existing technologies.

SUMMARY

Disclosed herein is a method of detecting a vibration of a drill string in a borehole. The method includes conveying the drill string into the borehole, the drill string including an electrical machine, the electrical machine including a stator and a movable element, the movable element movable relative to the stator, rotating the drill string in the borehole, determining, via a control circuit, a first amplitude of the vibration of the drill string by measuring a signal indicative of a movement of the movable element in the electrical machine due to rotation of the drill string, and controlling, via the control circuit, a downhole operation of the drill string based on the detected first amplitude of the vibration.

Also disclosed herein is a system for detecting a vibration of a drill string in a borehole. The system includes an electrical machine in the drill string. The electrical machine includes an electromagnet, a stator, and a movable element movable relative to the stator, and a control circuit. The control circuit is configured to control a magnetic field of the electromagnet, measure a signal indicative of a relative movement of the movable element with respect to the stator due to the vibration of the drill string, determine a first amplitude of the vibration of the drill string using the measured signal, and control a downhole operation of the drill string based on the detected first amplitude of the vibration of the drill string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
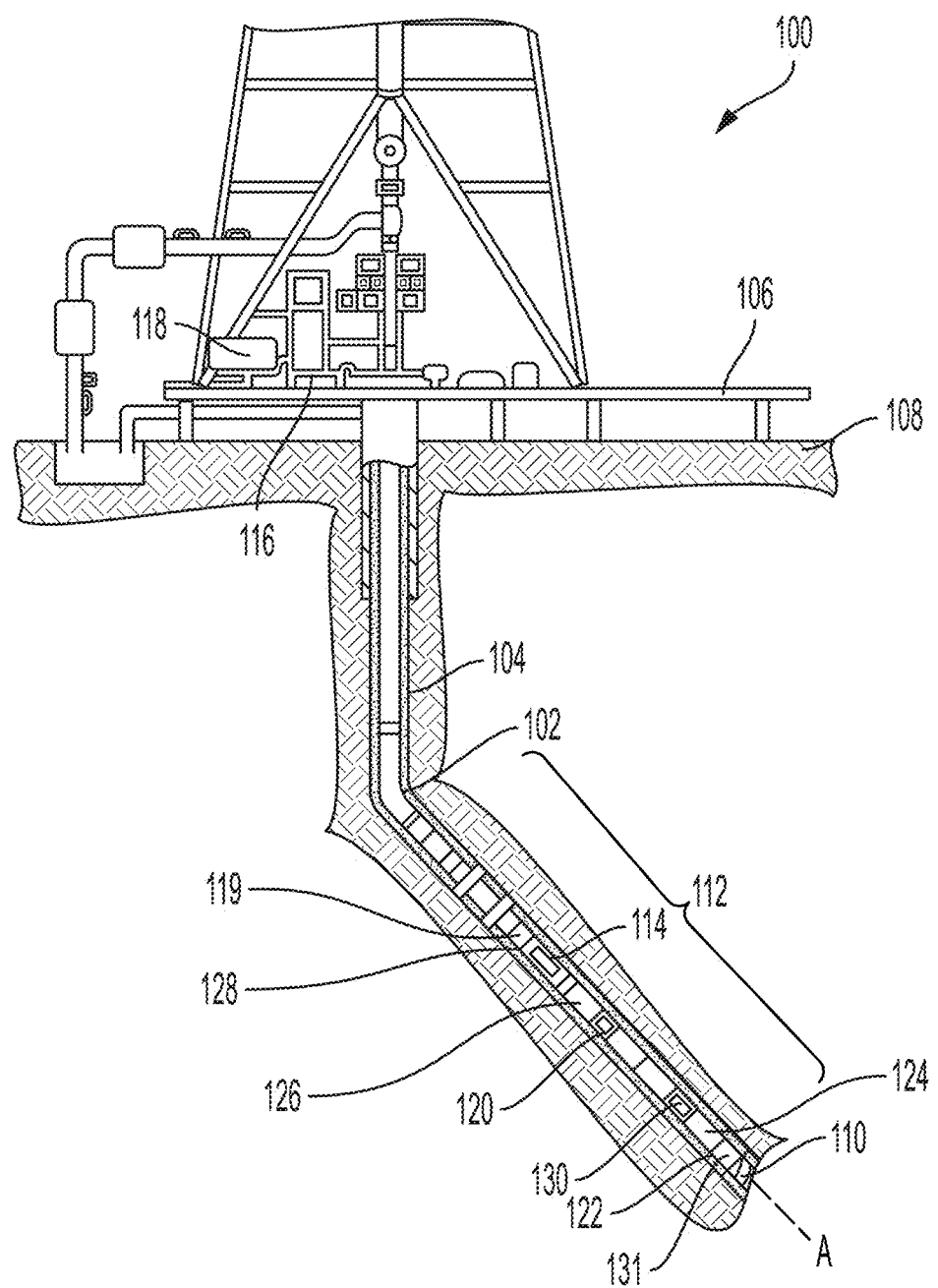
FIG. 1 shows a drilling system in an illustrative embodiment.

Referring to FIG. 1, a drilling system (100) is shown in an illustrative embodiment. The drilling system (100) includes a drill string (102) that extends into a borehole (104) from a platform (106) at a surface location (108). The drill string (102) includes a drill bit (110) disposed at a bottom end and a Bottom Hole Assembly (BHA) (112) uphole of the drill bit (110). The BHA (112) includes downhole components such as a downhole telemetry device (114) that communicates with a surface decoder device (116) at the platform (106). The downhole telemetry device (114) may be a mud pulser and transmits pressure pulse signals through a drilling fluid flowing within the drill string (102) from a downhole location to the earth surface to be received at the surface decoder device (116). The pressure pulses are created by an electrical device (120), such as an electrical machine, housed within the downhole telemetry device (114). The electrical machine may include an electric motor driving a plunger of a plunger valve or a rotating or oscillating rotor or a shear valve in the mud pulser. During drilling, the drilling fluid is pumped downhole through an inner bore of the drill string (102) to exit the drill string (102) through bit nozzles in the drill bit (110). The fluid then returns uphole through the borehole (104) within an annulus formed between the drill string (102) and the wall of the borehole (104) transporting drill cuttings out of the borehole. The drill string (102) and the borehole (104) are thus generally filled with drilling fluid. The BHA (112) may also include a mud motor (124) including a stator and a rotor, also referred to herein as movable element. The mud motor (124) is driven or powered by the drilling fluid flowing through the drill string (102) and the stator and generating a rotation of the rotor. The mud motor (124) is configured to rotate the drill bit (110). The BHA (112) may include one or more formation evaluation devices (FE devices) (126) or components, such as a density measurement device, an acoustic travel time device, a pressure testing device, and a resistivity measurement device. To detect orientation of the BHA (112) in the earth formation and the drilling direction, the BHA (112) includes a measurement while drilling (MWD) tool (128) including directional sensors such as a magnetometer configured to measure the earth magnetic field and an accelerometer configured to measure the gravitation force. In embodiments, the MWD tool (128) includes the telemetry device (114) and a power generator, such as an alternator. To detect drilling dynamics parameters, the BHA (112) may include a drilling dynamics measurement device (131)

including sensors such as one or more accelerometers, one or more magnetometers, one or more bending sensors (e.g. strain gauges), one or more axial load sensors (e.g. load cell), and one or more temperature sensors. The sensors in the dynamics measurement device (131) are configured to detect measurement signals at a high sampling rate (such as at least 1000 Hz) to resolve highly dynamic processes, such as torsional vibrations. In an embodiment, the drill string (102) may include another electrical device or electrical machine (130) that performs various operations downhole, such as for example an alternator in a downhole power generator that converts energy of the drilling fluid flow into electrical energy The BHA (112) may contain any number of electrical machines for various downhole operations or purposes, such as the electrical machine (120) in the mud pulser and the electrical machine (130) in the power generator or in any additional electrical machine. The one or more electrical machines (120, 130) can be located inside the BHA (112) at any location along a longitudinal axis (A) of the BHA (112) and the drill string (102) and at a distance from the drill bit (110). Wherein the locations along the longitudinal axis (A) of the electrical machine (120) and the electrical machine (130) or any additional electrical machine are different and are at different distances from the drill bit (110). That is the electrical machine (120), the electrical machine (130) and an additional electrical machine are not located at the same position along the longitudinal axis (A) of the BHA (112). The electrical machine (120) may be at a distance D2 and the electrical machine (130) may be at a distance D1 from the drill bit (110). An electrical machine as used in this application has a housing and the housing includes an electrical coil, such as an electrical coil in an electromagnet. The electrical machine also includes a magnet, such as an electromagnet or a permanent magnet. The electrical machine includes a moving part and a non-moving part, such as a rotor and a stator in an electric motor or in an alternator. The electrical coil may be located in one of the moving or non-moving part. The magnet may be located in the other of the moving or non-moving part. In embodiments, the electrical machine also includes a resolver or encoder.

A surface controller (118) at the surface location (108) can be used to control the operation of the drill string (102) (e.g. drilling operation) by varying drilling parameters of the drill string (102), such as rotation speed (revolutions per minute RPM) of the drill string (102) and the drill bit (110), flow rate of the drilling fluid, and weight applied to the drill bit (weight on bit WOB). A downhole controller (119) is included in the BHA (112) and is configured to control the operation of the drill string (102) automatically without interaction of the surface controller (118) or a human being. The downhole controller (119) may control the drilling direction, control the downhole data acquisition (FE devices), control the communication with the surface controller (118). The drilling direction can be controlled by orienting an adjustable kickoff (AKO) in the downhole motor or controlling a steering device in the BHA (not shown), such as a rotary steering unit. The operation of the drill string through either the surface controller (118) or the downhole controller (119) may be based on HFTO detected by the electrical machine and/or the conventional vibration sensor.

In an embodiment, the drill string (102) can include a conventional vibration sensor (122) disposed at or near the drill bit (110) or at any other position in the BHA (112). A conventional vibration sensor (122) is a rate sensor, an accelerometer, or a magnetometer. The conventional vibration sensor (122) is configured to detect vibrations, including high frequency torsional oscillations (HFTOs), which can be generated during the drilling process, for example, caused by cutting forces at the drill bit (110) or mass imbalances in components of the BHA (112), such as the mud motor (124). Impacts from HFTO can include, but are not limited to, reduced rate of penetration (ROP) of the drilling process, reduced quality of downhole measurements (FE data), and excess fatigue and wear on downhole components, tools, and/or devices. If beside the conventional vibration sensor (122) no additional vibration sensor is present in the BHA (112), the presence and magnitude of these propagated HTFOs can go undetected by the single conventional vibration sensor (122). For example, if the single conventional vibration sensor (122) is located in a node of the torsional vibration mode, the sensor (122) outputs only a small signal or no signal, although significant HFTO may occur at other points in the BHA (112). In an embodiment, a second vibration sensor positioned near an antinode of the torsional vibration mode is able to detect the HFTO. Thus, utilizing at least two vibration sensors (such as a conventional vibration sensor and an additional vibration sensor of some type) allows detecting mode shapes of the HFTO oscillation propagating along the drill string (102). A specific mode shape is associated with a natural frequency of the BHA (112) or drill string (102). The second vibration sensor may either be another conventional vibration sensor or may be a vibration sensor of a different type. In various embodiments, the second vibration sensor can be a device or part of a device already present in a drilling BHA (112) for another downhole operation or purpose, such as an electrical machine used within a mud pulser or an alternator used for power generation. Electrical machines may be part of a measurement-while-drilling tool that commonly includes a power generation module (alternator) and a telemetry device, such as a mud pulser. In an alternative embodiment the electrical machine may be included in any other component of the BHA (112), such as a formation evaluation device (e.g. a pressure testing device), or a coring device. An electrical machine in the BHA (112) has a dedicated purpose or is meant to perform a dedicated downhole operation, such as power generation, pressure pulse signal generation, coring bit rotation (coring bit motor), etc. Using the electrical machine in a multi-purpose use or multi-downhole operation use for also detecting torsional vibrations, allows sparing room for dedicated conventional vibration sensors. Beyond that, the number of devices in the BHA (112) that need to be maintained, and that potentially may fail causing costly non-productive time within the operation of the drill string is reduced.

HFTO oscillations or vibrations as disclosed herein are used with the same broad meaning of repeated and/or periodic movements or periodic deviations of a mean value, such as a mean position, a mean velocity, a mean acceleration, a mean force, and/or a mean torque. In particular, these terms are not meant to be limited to harmonic deviations, but may include all kinds of deviations, such as, but not limited to periodic, harmonic, and statistical deviations. As appreciated by those of skill in the art, different vibrations exist, such as lateral vibrations, axial vibrations, and torsional vibrations. For example, stick/slip of the whole drill string and HFTO are both types of torsional vibrations. Torsional vibrations may be excited by self-excitation mechanisms that occur due to the interaction of the drill bit or any other cutting structure such as a reamer bit and the earth formation. The main differentiator between stick/slip and HFTO is the frequency and typical mode shapes. For example, HFTO have a frequency that is typically above 50 Hz compared to stick/slip torsional vibrations that typically have frequencies below 1 Hz. Moreover, the excited mode shape of stick/slip is typically a first mode shape of the whole drill string whereas the mode shape of HFTO can be of higher order and are commonly localized to smaller portions of the drill string with comparably high amplitudes at the point of excitation that may be the bit or any other cutting structure (such as a reamer bit), or any contact between the drill string (102) and the formation (e.g., by a stabilizer). HFTO or torsional vibration in general is represented by an oscillating tangential acceleration, wherein tangential here refers to a direction tangential to a circumference of the BHA or a downhole component in a cross-section perpendicular to the longitudinal axis (A) of the BHA or the downhole component.

Figure 1A:
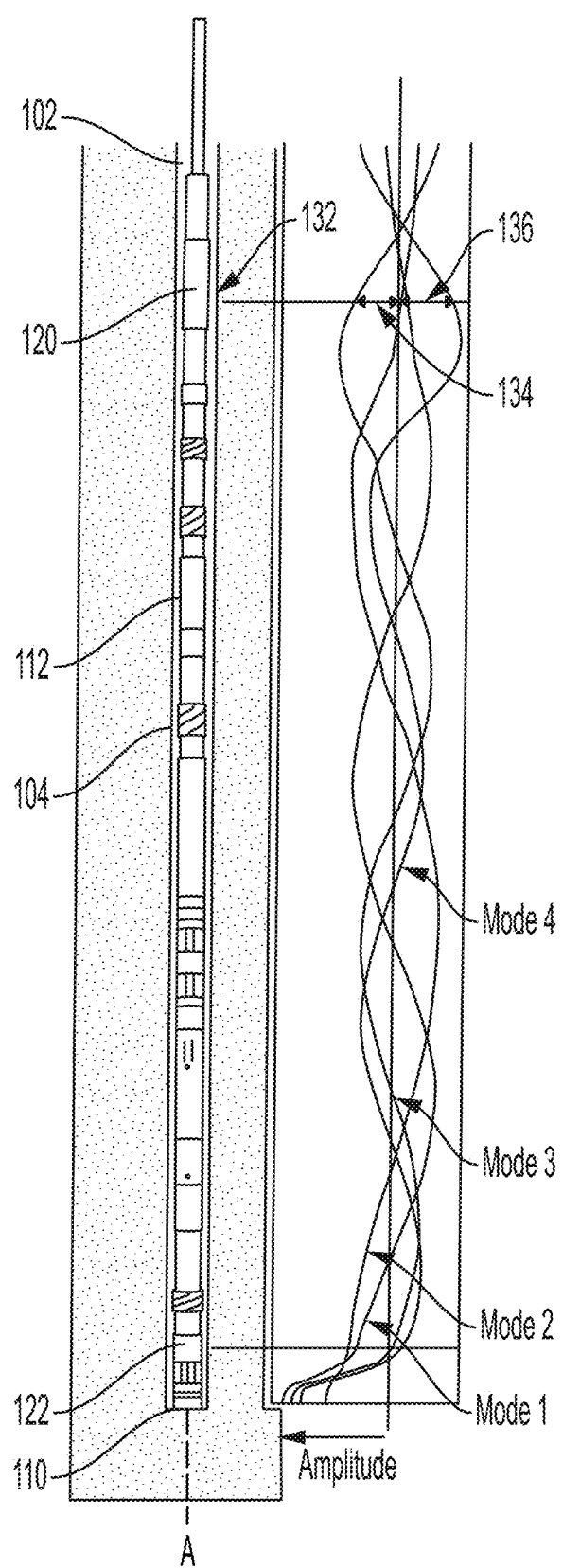
FIG. 1A shows a drilling BHA and a mode shape of a torsional vibration.

FIG. 1A shows a BHA (112) of the drill string (102), in an illustrative embodiment. The BHA (112) includes the conventional vibration sensor (122) positioned in close proximity to the drill bit (110) or anywhere else in the BHA. The conventional vibration sensor (122) is capable of detecting high frequency torsional vibration (HFTO). In various embodiments, the conventional vibration sensor (122) can be a rate sensor, a set of accelerometers, a magnetometer, etc. FIG. 1A further illustrates various torsional vibration modes: mode 1, mode 2, mode 3, and mode 4. Each torsional vibration mode is characterized by its mode shape (magnitude (i.e., amplitude along the BHA)) and frequency as well as its nodes and antinodes, which occur at various locations along the BHA (112). Mode 1 and mode 2 have high amplitudes at the location of the conventional vibration sensor (122), while mode 3 and mode 4 have small amplitudes (or nodes) at the location of the conventional vibration sensor (122). However, the amplitudes of mode 3 and mode 4 can be significant at locations away from the conventional vibration sensor (122). Electrical machine (120) is located at location (132) along the longitudinal axis (A) of the BHA (112). At location (132), the amplitudes of mode 3 (i.e., amplitude (134)) and of mode 4 (i.e., amplitude (136)) are significant. In an embodiment, the electrical machine (120) is used as an additional sensor (such as a second vibration sensor) for detecting vibration modes such as mode 3 and mode 4, which otherwise cannot be detected or identified by only the single conventional vibration sensor (122) in the BHA. The electrical machine (120) acts as the additional or second vibration sensor. Identifying a mode shape of a vibration mode requires at least two vibration sensors placed at different locations along the longitudinal axis (A) of the BHA (112). The second vibration sensor (electrical machine 120) in combination with the conventional vibration sensor (122) (rate sensor, accelerometer, or magnetometer) can verify or identify the occurrence of a specific HFTO mode (vibration mode) by matching frequency and amplitude (mode shape) with HFTO modes as derived from a simulation (e.g. modal analysis) performed for a specific BHA (e.g. BHA (112)). In the simulation, the BHA (112) may be represented by a BHA model defining the various diameters, material properties, locations of component connections, locations of specific devices (FE devices, mud motor, steering unit, MWD tool, stabilizers etc.). The simulation may be performed at the earth surface prior to or after the downhole operation. In an alternative embodiment, the simulation may be performed downhole during the downhole operation using the downhole controller (119).

Figure 2:
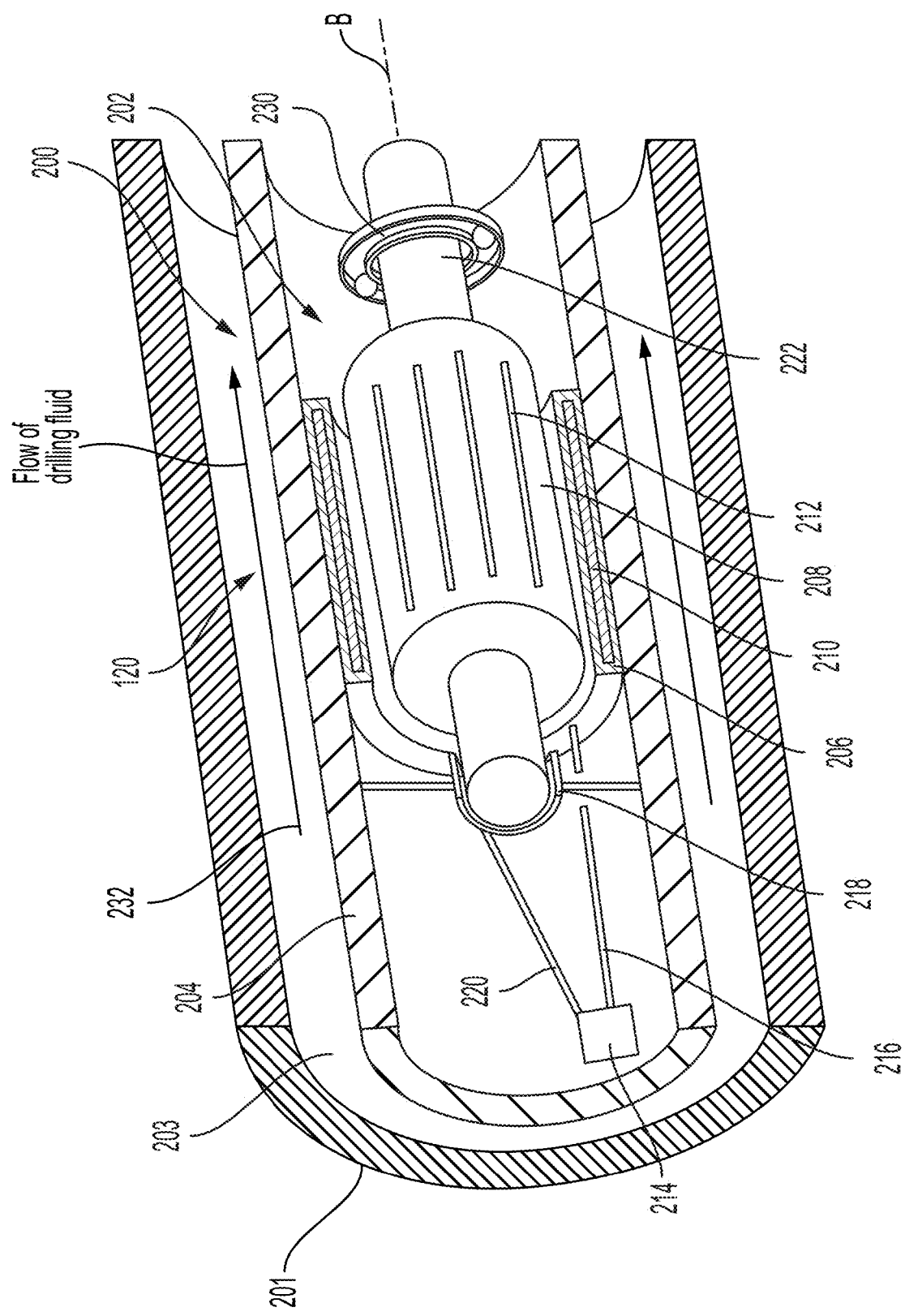
FIG. 2 shows a detailed component section of a bottom hole assembly of the drilling system.

FIG. 2 shows a detailed view of a component section (200) of the electrical machine (120), in an embodiment. The component section (200) is located inside a downhole component or tool in the BHA (112), such as for example a telemetry device (114). The downhole component includes a body (201). The body provides an inner space, such as an inner bore (203). The component section (200) of the electrical machine (120) is located within the inner space of the body (201) of the BHA (112). The inner space may also allow a flow of drilling fluid (232) to pass through the downhole component on the way from the earth surface to the bottom end of the BHA (drill bit (110)). The drilling fluid (232) may flow around the component section (200) of the electrical machine (120). An outer surface of the body (201) defines a wall of the annulus between the BHA (112) and the borehole wall. The outer surface of the body (201) is in contact with the drilling fluid flowing through the annulus on the way from the bottom end of the drill bit back to the earth surface. The component section (200) includes an electric motor (202) disposed in a housing (204). An outer surface of the housing (204) may be in contact with the drilling fluid. The housing (204) is mechanically coupled to the BHA (112), such as through the MWD tool or downhole telemetry device (114). In embodiments, the electrical machine (120) is coupled to the body (201) of the downhole component. The housing (204) is coupled to an inner surface of the body (201) of the downhole component. The coupling of the electrical machine (120) with the downhole component of the BHA (112) guarantees transfer of vibrations acting on the BHA (112) to the electrical machine (120) where the vibrations are detected. Typically, the housing (204) of the electrical machine (120) is located along a central axis of the BHA (112) or drill string (102). The central axis is parallel to the longitudinal axis (A) and represents the rotational axis of the BHA (112) or the drill string (102).

The electric motor (202) includes a stator (206) and a rotor (208). The stator (206) is stationary with respect to the body (201). The rotor (208) is rotatable with respect to the stator (206) and the body (201). The stator (206) includes an electromagnet (210) and the rotor (208) includes a magnet (such as a permanent magnet (212)). The electromagnet (210) includes one or more electrical coils. In embodiments the electromagnet includes a magnetic core. In various embodiments, the stator (206) includes a plurality of electromagnets and the rotor (208) includes a plurality of magnets. The plurality of magnets of the rotor (208) interacts with the plurality of the electromagnets of the stator (206) to generate a rotation of the rotor (208). The electromagnet (210) is powered and controlled by a control circuit (214), which may include an electronic module, or electronic circuit or processor, a current and/or voltage measurement module, and a power supply. The control circuit (214) is disposed in the BHA, such as for example in the telemetry tool (114) or the MWD tool and is connected to the electromagnet (210) by a first transmission line (216). In other embodiments, the stator (206) and the rotor (208) can both include electromagnets, or the stator (206) may include permanent magnets and the rotor may include electromagnets. A rotor shaft (222) couples the rotor (208) to additional elements, such as components for mud pulse telemetry, a rotary shear valve, or a coring bit, for example. The rotor shaft (222) is guided on bearings (230), which allow the rotor shaft (222) to rotate. The rotational axis (B) of the rotor (208) of the electrical machine (120) coincides with the central axis of the BHA (112). The rotor itself includes an inertia or is connected to an inertia (such as the inertia of the additional elements). A tangential force caused by a torsional vibration acting on the BHA (112) is acting also on the inertia associated with the rotor (208) of the electrical machine (120). This way the torsional vibration results in a rotation or oscillation of the rotor (208) of the electrical machine (120) and around the center axis of the BHA (112) and the rotational axis of the rotor (208).

A resolver (218) (or encoder) measures an angular position of the rotor (208) with respect to the stator (206) and generates a resolver signal indicative of this angular position. The resolver or encoder may be a magnetic device, an optical device or a mechanical device. The resolver (218) sends the resolver signal to the control circuit (214) via a second transmission line (220). The control circuit (214) receives the resolver signal and determines the angular position of the rotor (208) relative to the stator (206) from the resolver signal. The control circuit (214) compares the angular position to a desired angular position and controls a current being used at the electromagnet (210) of the stator (206) to control, modify or adjust a timing of the electromagnet (210) to adjust an angular position of the rotor (208) to the desired angular position. The desired angular position as used herein refers to an angular position of a normal rotor movement in a normal use of the electrical machine. A normal use is also referred herein as a first purpose use or first operational operation use of the electrical machine, such as driving a pulser valve, driving a coring bit, generating power, or measuring a length. A torque applied (e.g. related to torsional vibration acting on the inertia) to the rotor (208) creates a deviation between an actual angular position of the rotor and a target angular position for the rotor (desired angular position). This deviation in turn causes an increased current that is detected by the controller and which the controller uses to bring the actual angular position of the rotor back in line with the target position. A torque can be applied to the motor for many reasons, including an inertia induced torque. When subjected to angular acceleration (due to torsional vibration), the inertia from the additional elements and the rotor itself creates a torque at the rotor shaft (222) that results in an increase in current, which is used by the controller to control the motor, as described herein. A tangential force caused by a torsional vibration acting on the BHA (112) is acting as well on the inertia of the additional elements associated with the rotor (208) of the electrical machine (120). This way the torsional vibration results in a superimposed rotation or oscillation of the rotor (208) within the stator (206) of the electrical machine (120) and around the center axis of the BHA as well as the rotational axis (B) of the rotor (208). The superimposed rotation or oscillation is caused by torsional vibration acting on the downhole component that contains the electrical machine (120). The superimposed rotation or oscillation is superimposed on the rotation or oscillation of the rotor in the electrical machine (120) related to the first purpose use of the electrical machine (120). A second purpose use (second downhole operation use) of the electrical machine (120) is the detection of torsional vibration and/or the detection of torsional vibration modes. That is, the electrical machine (120) is installed in the BHA (112) to serve for a first purpose or to perform a first downhole operation. In a drilling operation, the electrical machine serves, beside for the first purpose, for a second purpose or performs a second downhole operation, such as the detection of torsional vibration in a vibration sensor use. The additional use of the electrical machine (120) as a vibration sensor is referred to as the dual-purpose use or dual-downhole operation use. The dual-purpose use of electrical machine(s) (120) in a BHA (112) allows for detecting vibration at locations along the longitudinal axis (A) of the BHA (112) where no conventional vibration sensor is installed.

Therefore, the angular position of the rotor (208) can be disturbed by the presence of HFTO on the electrical machine (120) housed in the downhole telemetry device (114). When HFTOs are applied to the drill string (102) and transferred to the component of the BHA (112) that houses the electrical machine (120), the resulting tangential acceleration of the inertia(s) associated with the rotor (208) creates a torque at the electric motor (202) and a torque at the rotor (208), affecting the relative angular position or movement between the stator (206) and the rotor (208). This affected relative position or movement is due, in part, to the inertia of the rotor shaft (222) and the rotor (208) as well as by additionally components coupled to the rotor (208) along the rotor shaft (222) accelerated by the HFTO acting on the inertias of the additional components of the rotor shaft and the inertia of the rotor (208). The resolver (218) measures this relative movement of the rotor (208) relative to the stator and the control circuit (214) corrects for this relative movement by controlling a motor signal being sent to the electromagnet (210) to bring the angular position of the rotor (208) relative to the stator (206) back to the desired angular position. The motor signal may be a current signal or a voltage signal. In various embodiments, the control circuit (214) controls an amplitude of a current signal. The amplitude of the current signal is proportional to the amplitude of the relative torsional acceleration and thus to the amplitude of the HFTO. Correspondingly, the control circuit (214) may control a voltage of the motor signal transmitted to the electromagnet (210). As described, the control circuit (214) may use the resolver signal to detect the torsional vibration of the BHA (112). In an alternative embodiment, the control circuit (214) may use the voltage induced in the coil(s) of the electromagnet(s) in the stator (206) caused by the movement of the rotor (208). The rotor (208) includes magnets (permanent magnets or electromagnets). The movement of the rotor (208) includes a normal movement (desired movement) based on the first purpose use of the electrical machine (120). Superimposed to this normal movement is a movement caused by the torsional vibration acting on the BHA (112) and the inertia associated with the rotor (208) and originating from the drilling process in a drilling operation. The superimposed movement of the rotor (208) within the stator (206) causes magnetic flux changes in the coils of the electromagnet of the stator (206) resulting in an electromotive force manifesting as a voltage. The polarity of the voltage opposes that of the applied voltage controlled by the control circuit (back electromotive force (back emf)). Therefore, the back emf modifies the voltage from the control circuit (214) to the electromagnet of the electrical machine (120). This effect allows the control circuit (214) to detect the torsional vibration via the control signal to the electromagnet of the stator (206).

In an embodiment, the electrical machine (120) is an alternator and is used to generate electrical energy in the BHA (112). The electrical energy can be used by a mud pulser to power an electrical motor to drive a pulser valve, to power an electrical motor of a coring bit, or to power hydraulic pumps in the BHA (112). The electrical energy may also be used to power electronics boards used in the BHA (112) to control the downhole operation, process data, store acquired data provided by downhole sensors, control hydraulic units, and other operations the like. As the alternator is similarly designed as a motor it can be used in the same fashion to detect vibration as described earlier with electrical machine (120) (FIG. 2). The alternator includes a rotor and a stator (206). The stator (206) may include a coil(s) as part of an electromagnet, and the rotor (208) may include a permanent magnet(s) or electromagnet(s). In an alternate embodiment, the rotor includes a coil(s) as a part of an electromagnet and the stator (206) may include a permanent magnet(s) or electromagnet(s). A turbine is connected to the rotor (208). When the turbine is rotated, such as by the flowing drilling fluid (232), the rotor (208) is rotated and induces a voltage in the coil(s) of the electromagnet in the stator (206). If a rotation or oscillation of the rotor (208) caused by vibration (e.g. torsional vibration) is superimposed to the rotation of the turbine, a back emf can be detected at the coil(s) in the stator (voltage or current at the coil). A control circuit (214) is used to analyze the voltage or current at the coil(s) and to detect the vibration. In FIG. 1, the electrical machine (120) may be a pulser motor and the electrical machine (130) may be an alternator. Both electrical machines can be used in a dual-purpose use mode. Electrical machine (120) is used as pulser motor (electric motor) and is used as a vibration sensor and electrical machine (130) is used as a power generator (alternator) and as a vibration sensor. Together with the conventional vibration sensor (122) in FIG. 1, three vibration sensors would be in the BHA (112) at three different locations along the longitudinal axis (A) of the BHA (112), allowing for detecting not only the occurrence of torsional vibration but also identifying torsional vibration mode shapes. Two vibration sensors are used to identify a vibration mode by analyzing the vibration data acquired by the two vibration sensors. Accordingly, electrical machine (120) and electrical machine (130) used in dual-purpose use mode are sufficient to detect and identify a vibration mode. Alternatively, electrical machine (120) in dual-purpose use together with conventional vibration sensor (122), or electrical machine (130) in dual-purpose use together with conventional vibration sensor (122), are sufficient to detect and identify a vibration mode.

Figure 3:
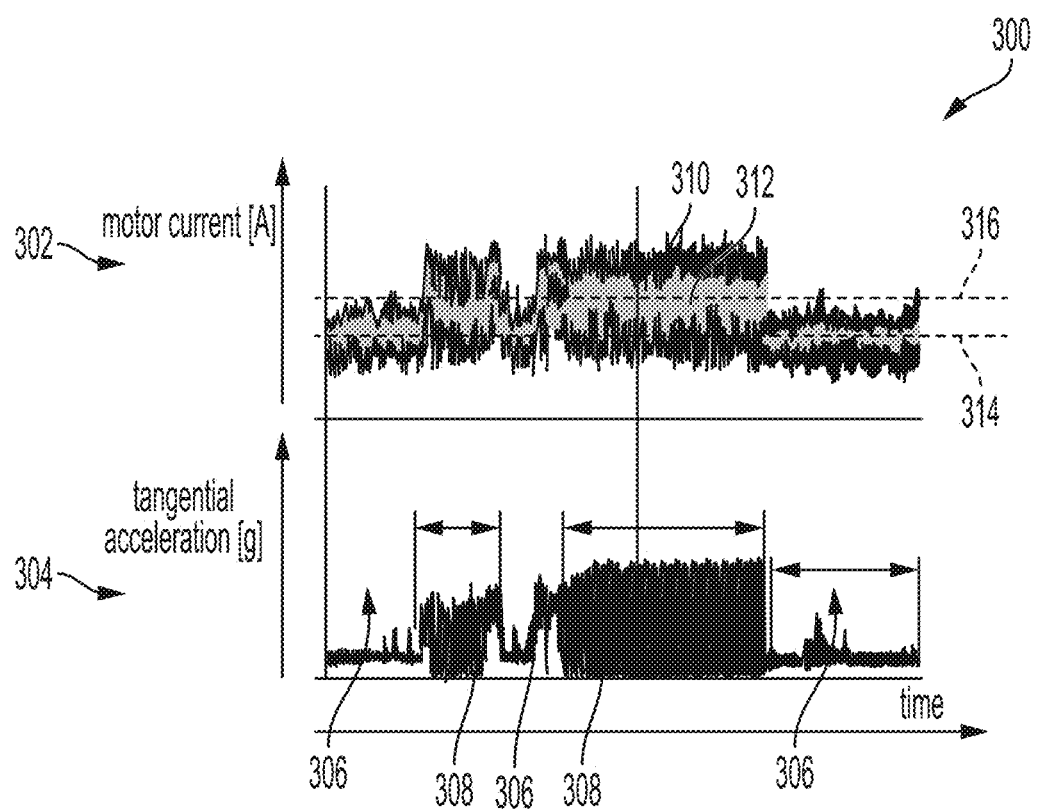
FIG. 3 shows a timeline of various parameters affected by a high frequency oscillation.

FIG. 3 shows a timeline (300) of various parameters affected by a high frequency torsional oscillation. A first graph (302) shows motor current in amps (A) (also referred to herein as electrical machine detected vibration signal) along its ordinate axis. A second graph (304) shows a tangential acceleration in units of gravitational acceleration (g) (also referred to herein as conventional vibration sensor detected vibration signal) along its ordinate axis. The conventional vibration sensor here is an acceleration sensor. The first graph (302) and the second graph (304) share the same abscissa, which shows time (e.g. in seconds (sec)). The length of the time interval shown in FIG. 3 is 190 minutes, or 11.400 seconds. The left vertical line corresponds to 0 seconds, the right vertical line refers to 100 minutes, or 6000 seconds. The vibration signal detected by the electrical machine and the vibration signal detected by the conventional vibration sensor are stored in a memory and analyzed by the control circuit (214).

Referring to the second graph (304), the time period shown includes low tangential vibration regions (306) of no or relatively small HFTO amplitude (small tangential acceleration) and high tangential vibration regions (308) in which HFTOs are present at significant HFTO amplitude (large tangential acceleration). The low tangential vibration regions (306) can be one or more regions and the high tangential vibration regions can be one or more regions.

Referring now to the first graph (302), both a raw or an unfiltered data set (310) of the current signal and a filtered data set (312) of the current signal is shown. The filtered data set may include data filtered for noise reduction. A low amplitude for the current signal corresponds to low tangential vibration regions (306). A high amplitude for the current corresponds to the high tangential vibration regions (308). This amplitude difference can be seen in both the unfiltered data set (310) and the filtered data set (312). A no-HFTO or no-vibration mean current (314) shows an average of the current amplitude corresponding to the low vibration regions (306). This mean current (314) can correspond to typical or normal operation of the electrical machine (130), such as driving a mud pulse telemetry valve. Normal operation is assumed to have no HFTO acting on the electrical machine (120). This average can be used as a baseline current signal, also referred to herein as a baseline signal. The baseline signal can be used to calculate a threshold (e.g. a threshold current) that can be used to indicate the need for HFTO mitigation, such as performing a mitigating operation. The threshold current may be defined experimentally using torsional vibration data recorded in a drilling operation and correlated to a wear state or a failure occurrence. The threshold current is then related to a torsional vibration amplitude that causes wear or component failures in the BHA (112). In an alternative embodiment, the threshold current may be related to the amplitude of the baseline signal. The threshold current may be defined to be a multiple of the baseline signal. In one embodiment, the threshold may be defined to be two times the current of the amplitude of the baseline signal. If, for example, the current measured in a high tangential vibration region exceeds two times the amplitude of the current of the baseline signal, then HFTO is defined as being detected. In embodiments, the threshold current may be defined as any multiple of the amplitude of the current of the baseline signal (1.5 times, 3 times, 10 times etc.). In one more embodiment, the threshold is related to the standard deviation to the amplitude baseline signal. HFTO mitigation can include adapting the drilling operation such as adjusting operational parameters. The operational parameters adjusted to mitigate HFTO may include weight on bit (WOB), rotation speed (RPM), flow rate of the drilling fluid, or drilling direction.

A high vibration mean current (316) shows an average of the current amplitude corresponding to the high tangential vibration regions (308). The high vibration mean current (316) can be compared to the baseline signal. When the high vibration mean current (316) exceeds the threshold current, the presence of the HFTO is detected. Additionally, when an HFTO is present, not only can its presence be detected, but also its amplitude and frequency can be detected. Using a high detection sampling rate of the current signal (e.g. 1000 Hz), the instantaneous amplitude and frequency of the HFTO can be derived by filtering the current signal and subtracting the mean current signal when no HFTO is present from the filtered signal. The control circuit (214) analyzes the recorded current signal (electrical machine detected vibration signal) to determine the frequency content. The analysis may include a Fast Fourier Transformation (FFT), a Power Spectrum Density analysis (PDS), or alternative frequency analysis techniques. When the high vibration mean current (316) exceeds the threshold current established by the baseline signal, an alert can be transmitted from the downhole telemetry device (114) to the surface decoder device (116). In another embodiment, the controller can detect an instantaneous amplitude and frequency of the HFTO and transmit those values to surface. In response, the controller (118) or an operator can control or adjust a drilling parameter applied to the drill string (102) to reduce the magnitude or presence of the HFTO (mitigating operation). For example, the controller (118) or the operator can reduce the RPM or the WOB or a combination of these.

In various embodiments, the current signal corresponding to the high tangential vibration regions (308) can be compared to the current signal corresponding to the low vibration regions (306) in either a temporal domain or a frequency domain (FFT). When the comparison is made in the frequency domain, the frequency of the HFTO in the high tangential vibration regions can also be detected.

Figure 4:
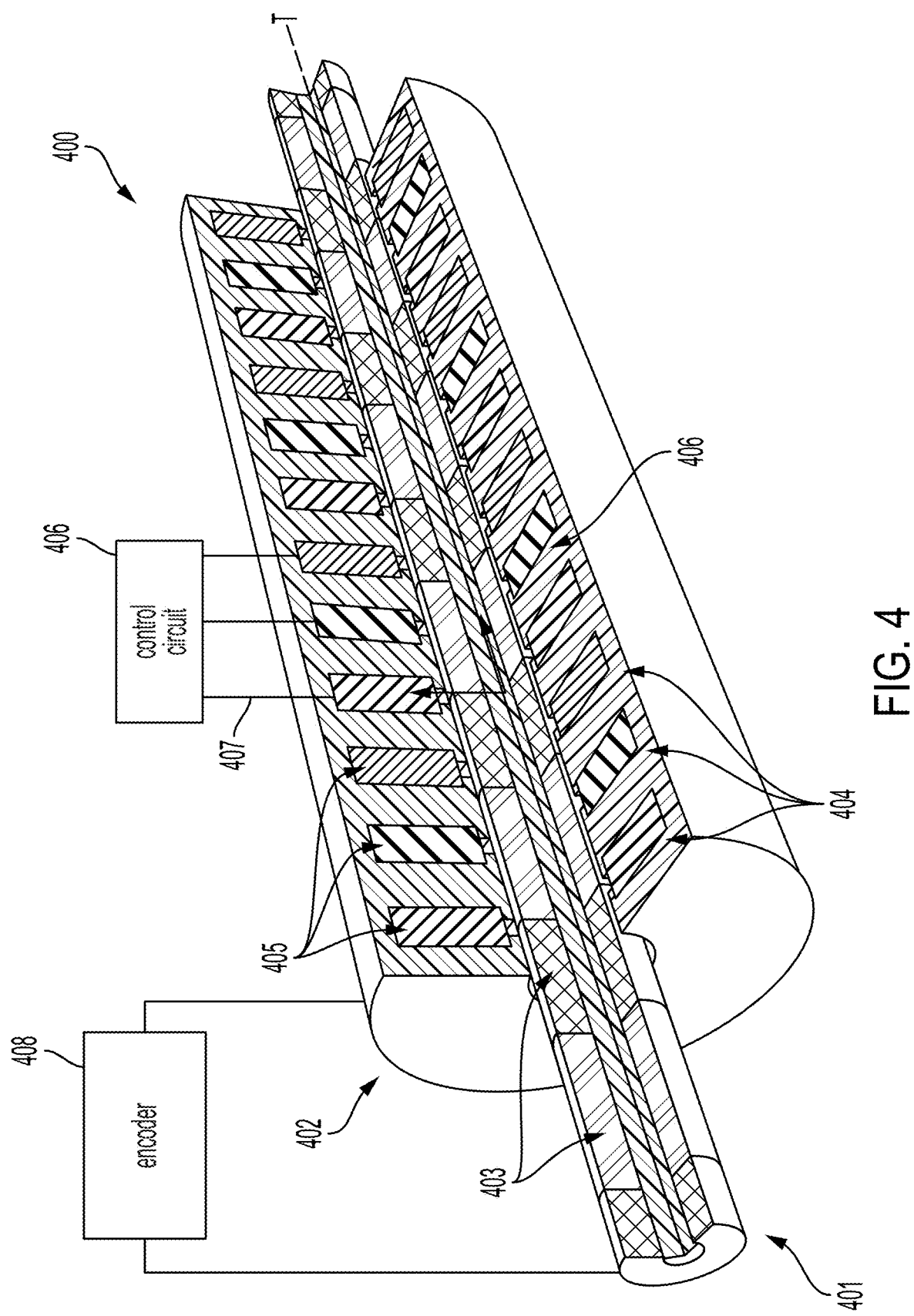
FIG. 4 shows a detailed view of a tubular linear motor.

FIG. 4 shows a detailed view of another type of an electrical machine, such as a tubular linear motor (400), located in a drill string (102). The tubular linear motor (400) is used to detect vibration in a drill string. Depending on the orientation relative to the longitudinal axis of the drill string, the linear motor can detect axial or lateral vibration in a similar fashion as a rotational motor is capable of detecting torsional vibration. The linear motor includes a stator (402) and a translator (401), also referred herein as movable element. The stator (402) surrounds the translator, and the translator is movable within the stator (402). The stator (402) is stationary with respect to the drill string (102). The translator includes a plurality of magnets (403), commonly permanent magnets. The stator (402) includes a plurality of electromagnets (404) including both an electric coil (405) and a magnetic core. The electromagnets are located in a stator iron (406). The orientation of the magnetic poles of the magnets (403) in the translator creates a magnetic field 90 degrees relative to the magnetic field created by the plurality of electromagnets (404). Commonly, linear motors run on a three-phase power supply to provide current to the plurality of electromagnets (404) in the stator (402). The varying phases between neighboring electromagnets (404) and the accordingly changing orientation of the resulting magnetic fields in the stator (402) interact with the magnetic fields of the magnets (403) in the translator (401) and moves the translator (401) relative to the stator (402). An acceleration acting on the inertia of the translator (401) due to vibration of the drill string leads to a variation of the current (back emf) provided to the electromagnets (404) in the stator (402) provided by a power supply. A control circuit (406), connected to the plurality of electromagnets (404) through transmission lines (407) controls the current provided to the plurality of electromagnets (404). The control circuit (406) is configured to measure a current or a voltage and detect current or voltage variations on the power provided to the plurality of electromagnets (404), providing a current signal or voltage signal. Analyzing the current or voltage signal allows detection of vibration of the drill string and determination of a vibration amplitude and frequency as described earlier. The linear motor may include an encoder (408) monitoring the movement of the translator relative to the stator (402). In an embodiment the control circuit (406) may detect the vibration of the drill string measuring and analyzing the encoder signal. There exist other linear motor types, such as an Iron core motor, or a U-channel motor that can be used alternatively to a tubular linear motor to detect vibration. The translator (401) may be coupled to additional elements, such as components that are to be moved by the translator. The additional elements (not shown) increase the inertia of the translator, making the translator more sensitive to vibration. As described with the rotational motor the linear motor located in a drill string is used in a dual-purpose use. The first purpose use of the linear motor may be driving a downhole robot arm, driving a plunger valve, handling and storing rock cores after they have been drilled, measuring a displacement, activating various downhole operations, such as extracting pads or blades. The second purpose use is the use as a vibration sensor. The translator of the linear motor includes a longitudinal axis (T). Axial vibration can be detected by the linear motor when the longitudinal axial of the translator (T) extends along the longitudinal axis (A) of the drill string. The longitudinal axis (T) of the translator may be parallel to the longitudinal axis (A) of the drill string or may be at a small angle to the longitudinal axis (A) of the drill string, such as between 0.1 degree and 10 degrees. Lateral vibration can be detected by the linear motor when the longitudinal axial (T) of the translator of the linear motor extends perpendicular to the longitudinal axis (A) of the longitudinal axis of the drill string. The longitudinal axis (T) of the translator may be 90 degrees to the longitudinal axis (A) of the drill string or may slightly deviate from being perpendicular to the longitudinal axis (A) of the drill string, such as between 0.1 degree and 10 degree off the perpendicular direction. The tubular linear motor (400) is located inside a housing (not shown). The housing including the tubular linear motor may be located inside the drill string and inside a body of a downhole component (not shown), such as inside the inner bore of the downhole component. In this case, the housing with the linear motor is in contact with the downhole fluid flowing through the inner bore. In an alternative embodiment, the linear motor may be located in a collar of a downhole component of the drill string (not shown). In this case, the linear motor is housed in a pocket of the collar and may be isolated from the downhole environment by a hatch cover. In another embodiment, a solenoid surrounding a magnet or magnetic material, as used with valves of the plunger-based mud pulser (solenoid valve) can be used to detect vibration of the drill string. In this embodiment, the current provided to the solenoid to move the magnet to close or open the valve is monitored by the control circuit to detect and analyze vibration. In this embodiment, the first purpose of the solenoid valve is the valve movement while the second purpose is the vibration detection. In yet another embodiment, a linear variable differential transformer (LVDT) may be used to detect vibration. In this embodiment, the first purpose use of the LVDT is the measure of linear displacements, while the second purpose use of the LVDT is vibration detection by observing the back emf caused by vibration of the drill string transferred to the movable component of the LVDT.

Set forth below are some embodiments of the foregoing disclosure:

Embodiment 1. A method of detecting a vibration of a drill string in a borehole, the method including conveying the drill string into the borehole, the drill string including an electrical machine, the electrical machine including a stator and a movable element, the movable element movable relative to the stator, rotating the drill string in the borehole, determining, via a control circuit, a first amplitude of the vibration of the drill string by measuring a signal indicative of a movement of the movable element in the electrical machine due to rotation of the drill string, and controlling, via the control circuit, a downhole operation of the drill string based on the detected first amplitude of the vibration.

Embodiment 2. The method of any prior embodiment, wherein detecting the first amplitude of the vibration of the drill string includes measuring at least one of: (i) a current; and (ii) a voltage provided to a coil located inside the electrical machine.

Embodiment 3. The method of any prior embodiment, wherein detecting the first amplitude of the vibration of the drill string includes detecting a signal of at least one of: (i) a resolver; and (ii) an encoder associated with the movable element in the electrical machine.

Embodiment 4. The method of any prior embodiment, wherein controlling the downhole operation includes performing a mitigating operation when the detected first amplitude of the vibration exceed a threshold.

Embodiment 5. The method of any prior embodiment, wherein the drill string includes a longitudinal axis and the electrical machine and a vibration sensor are located in the drill string at different locations along the longitudinal axis, further comprising determining a second amplitude of the vibration of the drill string using the vibration sensor, and using the first amplitude of the vibration of the drill string and the second amplitude of the vibration of the drill string to identify a vibration mode of the vibration of the drill string.

Embodiment 6. The method of any prior embodiment, wherein the vibration sensor is one of an accelerometer and a magnetometer.

Embodiment 7. The method of any prior embodiment, wherein the vibration sensor is another electrical machine in the drill string.

Embodiment 8. The method of any prior embodiment, wherein identifying the vibration mode of the vibration of the drill string includes using a simulation.

Embodiment 9. The method of any prior embodiment, wherein the electrical machine is one of a motor and an alternator.

Embodiment 10. The method of any prior embodiment, wherein the vibration of the drill string is a high frequency torsional oscillation (HFTO).

Embodiment 11. The method of any prior embodiment, further including determining a frequency of the detected first amplitude of the vibration of the drill string using the control circuit.

Embodiment 12. A system for detecting a vibration of a drill string in a borehole. The system includes an electrical machine in the drill string and a control circuit. The electrical machine includes an electromagnet, a stator, and a movable element movable relative to the stator. The control circuit is configured to control a magnetic field of the electromagnet, measure a signal indicative of a relative movement of the movable element with respect to the stator due to vibration of the drill string, determine a first amplitude of the vibration of the drill string using the measured signal, and control a downhole operation of the drill string based on the detected first amplitude of the vibration of the drill string.

Embodiment 13. The system of any prior embodiment, wherein the measured signal is one of at least: (i) a current; and (ii) a voltage provided to the electromagnet.

Embodiment 14. The system of any prior embodiment, further including a resolver or an encoder, wherein the measured signal is at least one of: (i) a resolver signal; and (ii) encoder signal.

Embodiment 15. The system of any prior embodiment, wherein the movable element is one of a rotor and a translator.

Embodiment 16. The system of any prior embodiment, wherein the vibration is a high frequency torsional oscillation (HFTO).

Embodiment 17. The system of any prior embodiment, wherein the electrical machine is one of a motor and an alternator.

Embodiment 18. The system of any prior embodiment, further including a vibration sensor in the drill string, the electric machine and the vibration sensor being located at different locations along a longitudinal axis of the drill string, wherein the control circuit is configured to determine a second amplitude of the vibration of the drill string using the vibration sensor, and use the first amplitude of the vibration of the drill string and the second amplitude of the drill string of the vibration to identify a vibration mode of the vibration of the drill string.

Embodiment 19. The system of any prior embodiment, wherein the vibration sensor is one of an accelerometer and a magnetometer.

Embodiment 20. The system of any prior embodiment, wherein the vibration sensor is another electrical machine in the drill string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of #8% or 5%, or 2% of a given value.

The learnings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of detecting a vibration of a drill string in a borehole, the method comprising:
conveying the drill string into the borehole, the drill string including an electrical machine, the electrical machine including a stator and a movable element, the movable element movable relative to the stator;
rotating the drill string in the borehole;
determining, via a control circuit, a first amplitude of the vibration of the drill string by measuring a signal indicative of a movement of the movable element in the electrical machine due to rotation of the drill string; and controlling, via the control circuit, a downhole operation of the drill string based on the detected first amplitude of the vibration of the drill string.

2. The method of claim 1, wherein detecting the first amplitude of the vibration of the drill string includes measuring at least one of: (i) a current; and (ii) a voltage provided to a coil located inside the electrical machine.

3. The method of claim 1, wherein detecting the first amplitude of the vibration of the drill string includes detecting a signal of at least one of: (i) a resolver; and (ii) an encoder associated with the movable element in the electrical machine.

4. The method of claim 1, wherein controlling the downhole operation includes performing a mitigating operation when the detected first amplitude of the vibration of the drill string exceeds a threshold.

5. The method of claim 1, wherein the drill string includes a longitudinal axis and the electrical machine and a vibration sensor are located in the drill string at different locations along the longitudinal axis, further comprising determining a second amplitude of the vibration of the drill string using the vibration sensor, and using the first amplitude of the vibration of the drill string and the second amplitude of the vibration of the drill string to identify a vibration mode of the vibration of the drill string.

6. The method of claim 5, wherein the vibration sensor is one of an accelerometer and a magnetometer.

7. The method of claim 5, wherein the vibration sensor is another electrical machine in the drill string.

8. The method of claim 5, wherein identifying the vibration mode of the vibration of the drill string includes using a simulation.

9. The method of claim 1, wherein the electrical machine is one of a motor and an alternator.

10. The method of claim 1, wherein the vibration of the drill string is a high frequency torsional oscillation (HFTO).

11. The method of claim 1, further comprising determining a frequency of the detected first amplitude of the vibration of the drill string using the control circuit.

12. A system for detecting a vibration of a drill string in a borehole, the system comprising:

an electrical machine in the drill string, the electrical machine including an electromagnet, a stator, and a movable element movable relative to the stator;
a control circuit configured to:
control a magnetic field of the electromagnet;
measure a signal indicative of a relative movement of the movable element with respect to the stator due to the vibration of the drill string;
determine a first amplitude of the vibration of the drill string using the measured signal; and
control a downhole operation of the drill string based on the detected first amplitude of the vibration of the drill string.

13. The system of claim 12, wherein the measured signal is at least one of: (i) a current; and (ii) a voltage provided to the electromagnet.

14. The system of claim 12, further comprising a resolver or an encoder, wherein the measured signal is at least one of: (i) a resolver signal; and (ii) an encoder signal.

15. The system of claim 12, wherein the movable element is one of a rotor and a translator.

16. The system of claim 12, wherein the vibration of the drill string is a high frequency torsional oscillation (HFTO).

17. The system of claim 12, wherein the electrical machine is one of a motor and an alternator.

18. The system of claim 12, further comprising a vibration sensor in the drill string, the electrical machine and the vibration sensor being located at different locations along a longitudinal axis of the drill string, wherein the control circuit is configured to:
determine a second amplitude of the vibration of the drill string using the vibration sensor; and
use the first amplitude of the vibration of the drill string and the second amplitude of the vibration of the drill string to identify a vibration mode of the vibration of the drill string.

19. The system of claim 18, wherein the vibration sensor is one of an accelerometer and a magnetometer.

20. The system of claim 18, wherein the vibration sensor is another electrical machine in the drill string.

* * * * *